(12) United States Patent  (10) Patent No.: US 9,310,233 B2
Schmidt  (45) Date of Patent: Apr. 12, 2016

(54) FLOW RATE MONITORING FOR AGROCHEMICAL APPLICATIONS

(71) Applicant: CHS, Inc., Inver Grove Heights, MN (US)

(72) Inventor: Robert Blaine Schmidt, Holyoke, CO (US)

(73) Assignee: CHS, Inc., Inver Grove Heights, MN (US)

( * ) Notice: Subject to any disclaimer, the term of this patent is extended or adjusted under 35 U.S.C. 154(b) by 132 days.

(21) Appl. No.: 13/932,537

(22) Filed: Jul. 1, 2013

(65) Prior Publication Data

US 2014/0047916 A1  Feb. 20, 2014

Related U.S. Application Data

(60) Provisional application No. 61/683,773, filed on Aug. 16, 2012.

(51) Int. Cl.
*G01F 7/00* (2006.01)
*G01F 1/05* (2006.01)
*A01M 7/00* (2006.01)
*A01C 23/00* (2006.01)

(52) U.S. Cl.
CPC ............... *G01F 1/05* (2013.01); *A01C 23/007* (2013.01); *A01M 7/0089* (2013.01)

(58) Field of Classification Search
CPC .......... G01F 7/00; A01G 25/092; B05B 1/08; B05B 7/0408; A01M 7/0075
USPC ............. 73/197; 11/119, 200; 239/1, 11, 166, 239/428
See application file for complete search history.

(56) References Cited

U.S. PATENT DOCUMENTS

| | | | |
|---|---|---|---|
| 4,637,547 A | 1/1987 | Hiniker et al. | |
| 5,315,862 A * | 5/1994 | Hasselmann | G01M 3/2892 73/40.5 R |
| 5,950,921 A * | 9/1999 | Cain | A01M 7/0089 239/1 |
| 6,003,455 A * | 12/1999 | Flamme | A01C 15/00 111/200 |
| 6,269,757 B1 * | 8/2001 | Kiest | A01C 23/024 111/119 |
| 6,688,245 B2 * | 2/2004 | Juptner | A01B 63/32 111/200 |
| 6,748,884 B1 * | 6/2004 | Bettin | A01C 7/06 111/119 |
| 7,024,285 B2 * | 4/2006 | Saelens | B05B 12/085 239/69 |
| 7,096,802 B1 * | 8/2006 | Kiest | A01C 23/024 111/119 |
| 7,162,961 B2 * | 1/2007 | Grimm | A01C 23/024 111/119 |
| 7,311,004 B2 * | 12/2007 | Giles | A01C 23/047 239/172 |
| 7,494,070 B2 * | 2/2009 | Collins | B05B 3/02 239/101 |
| 7,502,665 B2 * | 3/2009 | Giles | A01B 79/005 137/78.2 |
| 7,726,251 B1 * | 6/2010 | Peterson | A01B 79/005 111/185 |
| 7,779,768 B2 * | 8/2010 | Forsyth | A01C 23/024 111/119 |
| 7,789,321 B2 * | 9/2010 | Hitt | A01G 25/167 239/207 |

(Continued)

OTHER PUBLICATIONS

Delta Farm Press, Innoquest unveils flow meter for irrigation nozzles, 3 pages, Jun. 6, 2012.

(Continued)

*Primary Examiner* — Lisa Caputo
*Assistant Examiner* — Nigel Plumb
(74) *Attorney, Agent, or Firm* — Merchant & Gould P.C.

(57) ABSTRACT

A system for estimating a flow rate of an agrichemical includes a conduit delivering the agrichemical from a repository to an application in a field, and a flow meter connected in-line with the conduit. The flow meter provides an estimate of a flow rate of the agrichemical through the conduit.

19 Claims, 6 Drawing Sheets

(56) References Cited

U.S. PATENT DOCUMENTS

| | | | |
|---|---|---|---|
| 7,826,930 B2 | 11/2010 | Giles et al. | |
| 7,925,404 B2 * | 4/2011 | Dillman | A01C 7/102 111/177 |
| 7,975,981 B2 * | 7/2011 | Harrison, Jr. | A01B 79/005 251/129.15 |
| 8,024,075 B2 * | 9/2011 | Fekete | G05B 15/02 239/63 |
| 8,028,927 B2 * | 10/2011 | Ward | A01M 7/0089 239/1 |
| 8,109,448 B2 * | 2/2012 | Giles | A01M 7/006 239/428 |
| 8,132,741 B2 * | 3/2012 | Tremblay, Jr. | A01M 7/006 239/127 |
| 8,185,248 B2 * | 5/2012 | Ensworth | A01G 25/16 239/63 |
| 8,191,795 B2 * | 6/2012 | Grimm | A01M 7/0089 239/1 |

OTHER PUBLICATIONS

Sure Fire AG Sytems, Fertilizer Application Kits, 2 pages, accessed on Aug. 27, 2013.
Raven Industries, Product Guide Spring 2013, 40 pages, May 2013.
Raven Industries, Application Controls web page, 1 page, accessed on Aug. 27, 2013.
JLC International, Inc., Beverage Turbine Flow Meter Series 300, 2 pages, obtained prior to Applicant's filing date.

* cited by examiner

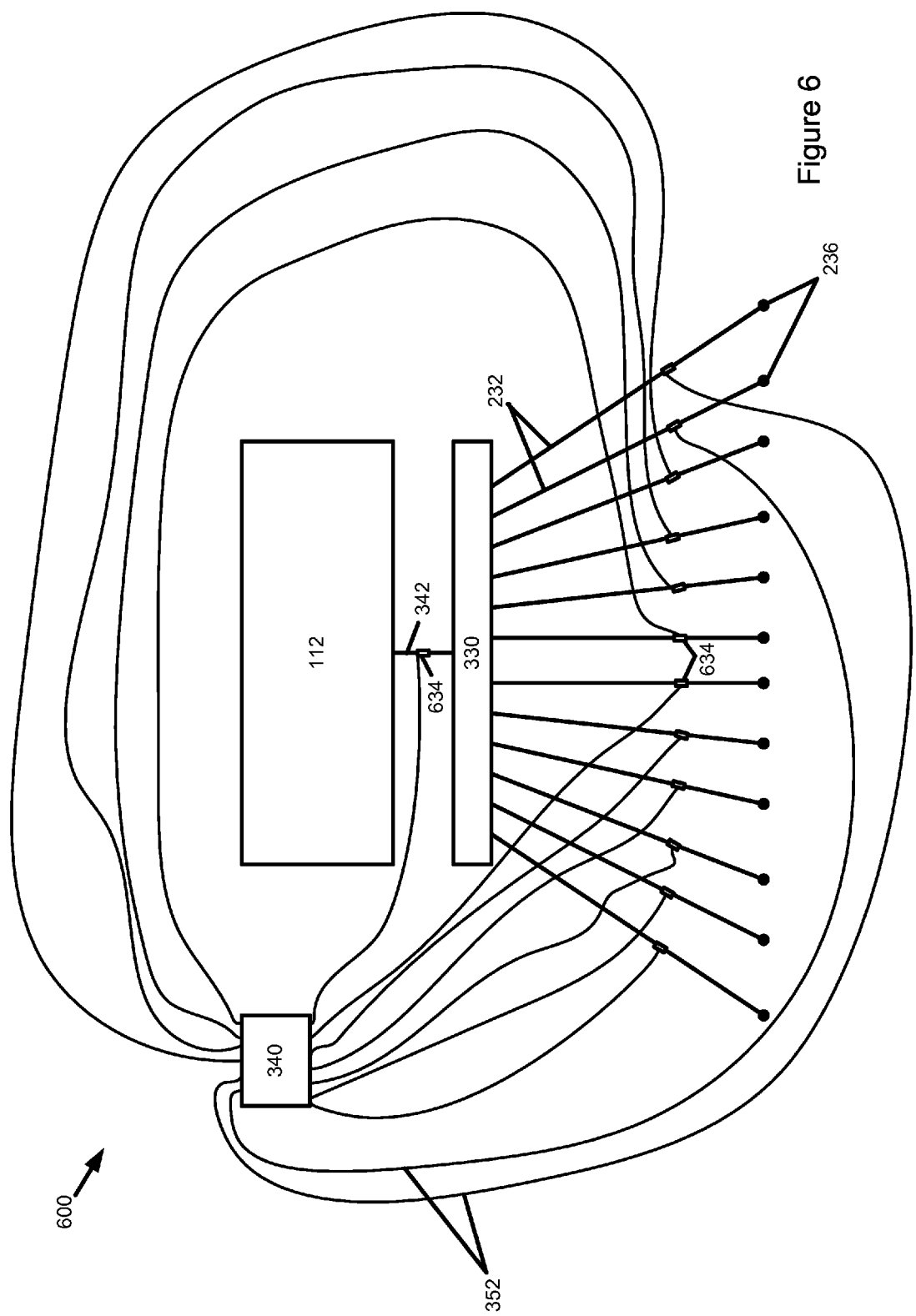

FLOW RATE MONITORING FOR AGROCHEMICAL APPLICATIONS

CROSS-REFERENCE TO RELATED APPLICATION(S)

This application claims priority to U.S. Ser. No. 61/683,773, titled FLOW RATE MONITORING FOR AGROCHEMICAL APPLICATIONS, filed on Aug. 16, 2012, the disclosure of which is hereby incorporated by reference in its entirety.

BACKGROUND

Agricultural cultivators are commonly pulled by a tractor to work the soil of a field. The cultivators may be combined with an applicator that applies agrochemicals, such as fertilizer and/or herbicides/insecticides, in a liquid form to the soil as it is cultivated. The cultivators are often designed to work the soil in rows, and separate applicator nozzles can be used to apply the liquid to the ground for each row. There may be as many as 24 to 48 rows and associated nozzles.

It is not uncommon for these nozzles to become plugged during operation, thereby reducing or completely blocking application of the agrochemicals to the soil. When this occurs, particular rows of the field may receive an inadequate amount of the agrochemicals. This can result in the growth of weeds along those rows in the case of inadequate herbicides and can result in stilted growth in the case of inadequate fertilizers. Often the blockage of the nozzle only becomes apparent to the farmer when such growth abnormalities later appear in the field.

One system provided on agricultural cultivators to assist the operator in estimating the flow to each nozzle is a mechanical system positioned in each agrochemical line. One example of such a system is a series of semi-floatable balls positioned within each of the agrochemical lines, such as the Redball® spray monitor system manufactured by Willmar Fabrication, LLC, of Willmar, Minn.

In the Redball® spray monitor system, liquid supplied to each nozzle is first passed through a clear plastic chamber that contains a red-colored ball. The density of the ball is selected to be denser than the density of the fluid, but light enough that, as fluid flows upward through the chamber, the red ball rises in the chamber. As a result, when fluid is flowing, the ball is elevated within the chamber. If a spray nozzle becomes clogged, the corresponding ball will fall to the bottom of the chamber indicating that the no (or little) fluid is flowing through the associated nozzle.

There are several significant drawbacks with the Redball® spray monitor system: (1) some desired fluids have a dark color, but the Redball® spray monitor system does not work with dark colored fluids because the ball cannot be easily seen through the dark fluid; (2) the Redball® spray monitor system is typically positioned behind the tractor driver, so that the driver must either frequently turn around to look at the monitor, or a camera must be used to feed a cab-mounted display positioned in front of the driver; (3) the Redball® spray monitor system must be mounted in a precise vertical orientation to function properly; and (4) the Redball® spray monitor system is imprecise, in that the system is best suited to simply indicate whether there is liquid flow or not, rather than to quantify the amount of liquid that is flowing.

In addition to spray monitor systems, some farmers utilize a single flow meter for the entire system that indicates the flow rate (i.e., gallons/minute) through the entire system. In other words, the flow meter is arranged between the liquid storage tank and the spray monitors and indicates how much liquid is coming out of the tank. This flow meter does not identify the amount of liquid that is being supplied to each individual nozzle and will not indicate whether liquid is flowing through all nozzles.

SUMMARY

In general terms, this disclosure is directed to flow rate monitoring. In one possible configuration and by non-limiting example, the flow rate monitoring is used for agrochemical applications. Various aspects are described in this disclosure, which include, but are not limited to, the following aspects.

One aspect is a system for estimating a flow rate of an agrichemical, the system comprising: a conduit delivering the agrichemical from a repository to an application in a field; and a flow meter connected in-line with the conduit, the flow meter providing an estimate of a flow rate of the agrichemical through the conduit.

Another aspect is a system for delivering agrochemicals to a field of crops, the system comprising: a tractor; a farm implement pulled by the tractor, the farm implement including a tank of agrichemical and a plurality of conduits to deliver an agrichemical from the tank to a plurality of rows in a field; and a plurality of flow meters, with each of the flow meters being connected in-line with a respective one of the conduits, the flow meters providing an estimate of a flow rate of the agrichemical through each of the conduits.

DESCRIPTION OF THE DRAWINGS

FIG. 6 shows a schematic view of an alternative embodiment of an agrichemical application system.

DETAILED DESCRIPTION

This application is directed to a spray monitor system for dispensing of agrochemicals. In some examples, a flow meter is provided in-line with the conduits that provide agrochemicals to each nozzle of an agrichemical application system. The spray monitor system obtains data from each of the flow meters and provides accurate information relating to an amount of agrochemicals being delivered by each nozzle of the agrichemical system. In this manner, the spray monitor system not only provides an indication of whether or not liquid is flowing through each nozzle, but also a precise reading of the amount of liquid.

In the examples provided herein, an agrichemical can be any liquid that is delivered to improve the production of crops. This includes, but is not limited to, such liquids as: pesticides; herbicides; insecticides; hormones, fungicides, other plant growth regulators; defoliants; fertilizers; etc.

In addition, certain farm implements are described herein, such as a planter. However, the principles described herein are applicable to any type of equipment that delivers a liquid like an agrichemical, such as cultivators, sprayers, and seeders. Many configurations are possible.

Figure 1:
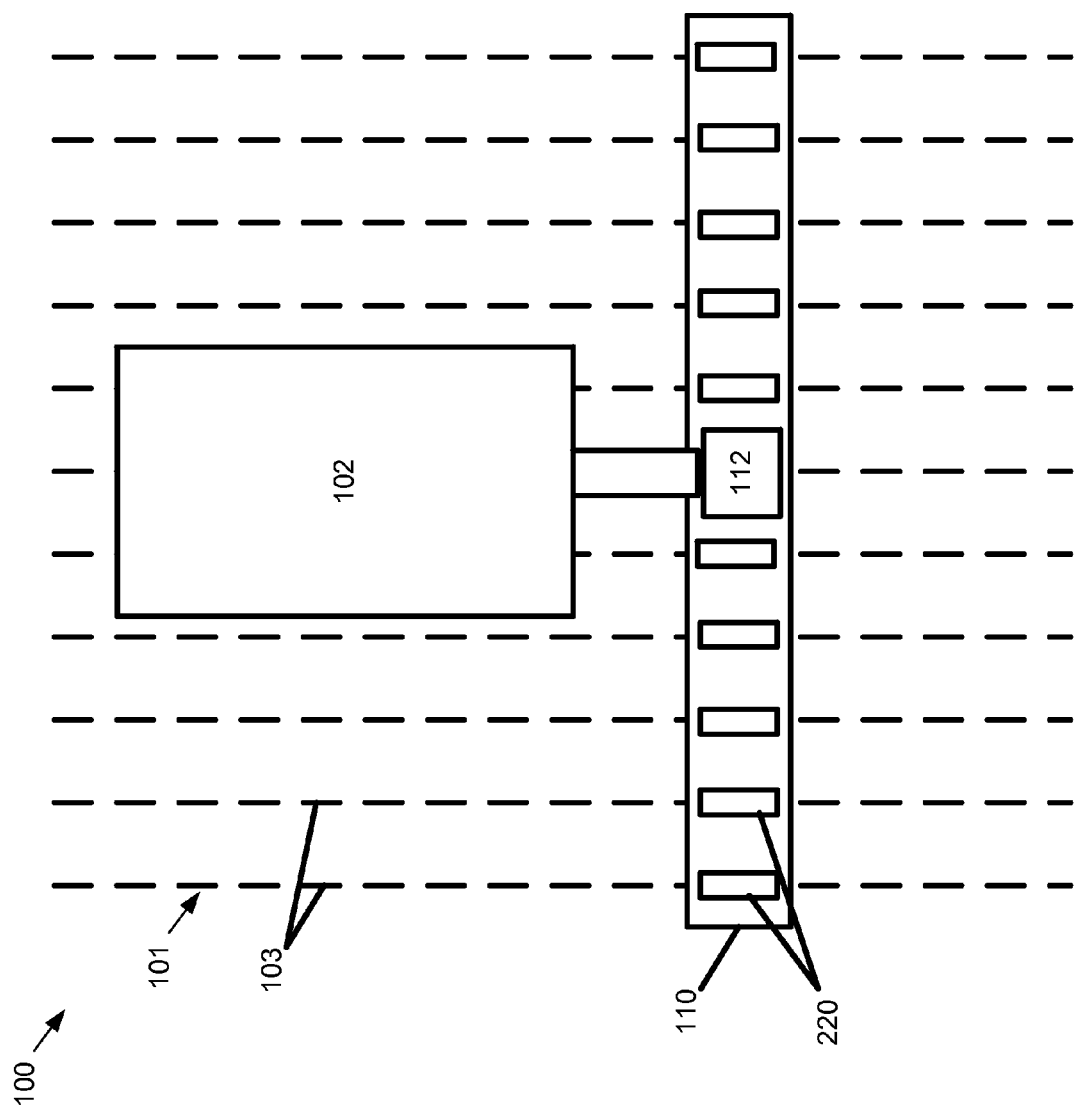
FIG. 1 shows a top view of an example system for applying agrochemicals to a field.
Figure 2:
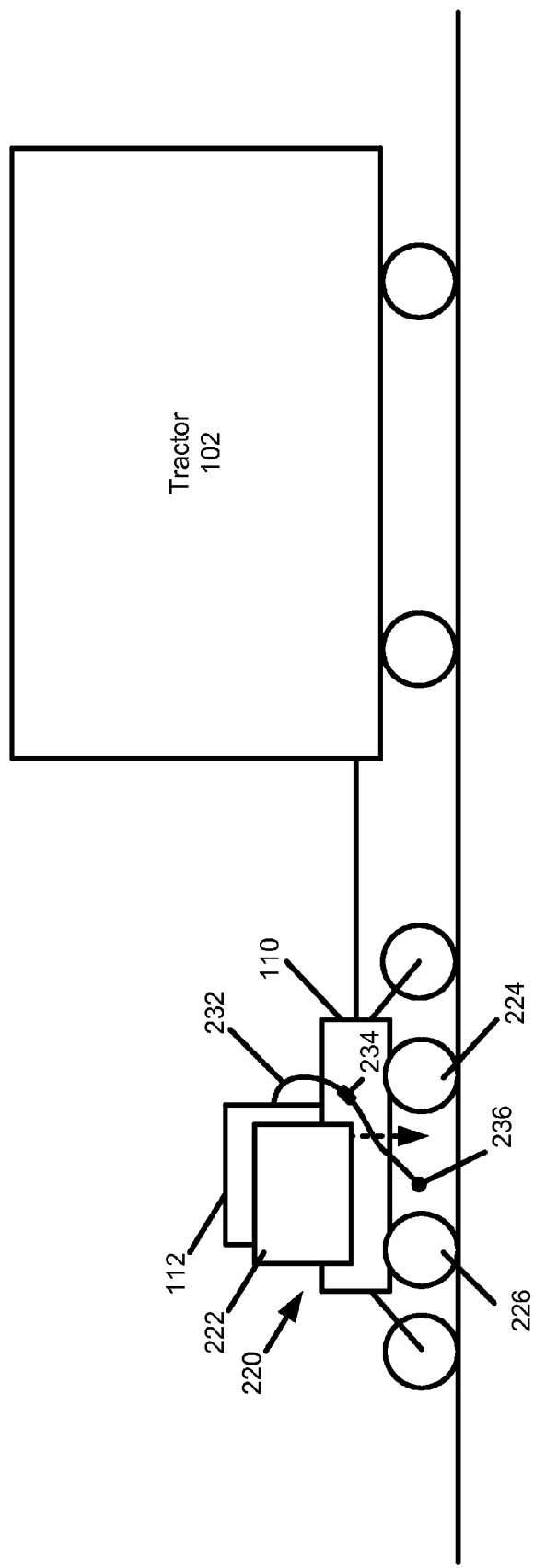
FIG. 2 shows a side view of the system of FIG. 1.

Referring now to FIGS. 1-2, an example an example system 100 is shown. The system includes a tractor 102 that is pulling a farm implement, such as a planter 110, for planting crops and/or delivering agrichemicals. In this example, the planter 110 lays a seed, such as corn, down in precise manner along rows 103 of a field 101.

Seeds are distributed through devices called row units 220. The row units 220 are spaced evenly along the planter 110. Each row unit 220 includes a seed bin 222 that holds seed, and the seed is delivered (typically vacuum-fed) into the ground at desired intervals. Disc openers 224 open up a furrow in the ground into which seed is dropped. The rate of seeding typically can be controlled as desired. Finally, closing wheels 226 close the furrow over the planted seeds.

In this example, the planter 110 includes 12 row units 220. Planters vary from 2 to 48 row units. The space between the row units 220 also varies, with a common row spacing in the United States being 30 inches. One example of such a planter is the DB120 Planter manufactured by John Deere of Moline, Ill.

The planter 110 also delivers agrichemicals as part of the planting process. In this example, an agrichemical tank 112 houses a liquid, such as a fertilizer or insecticide, that is delivered into the ground as part of the planting process. Specifically, a conduit 232 runs from the agrichemical tank 112 to a nozzle 236 located at the point of planting so that the agrichemical is delivered into the furrow before the closing wheels 226 close the furrow over the seed.

In this example, the conduit 232 includes a flow meter 234 that is positioned in-line with the conduit 232. As described further below, the flow meter 234 measures the rate of flow of agrichemical within the conduit 232. For example, the flow meter 234 can include a wheel that spins (like a turbine) as the agrichemical flows through the flow meter 234. By measuring the rate of spin, an estimate of the flow rate of the agrichemical can be obtained. Other configurations are possible.

Figure 3:
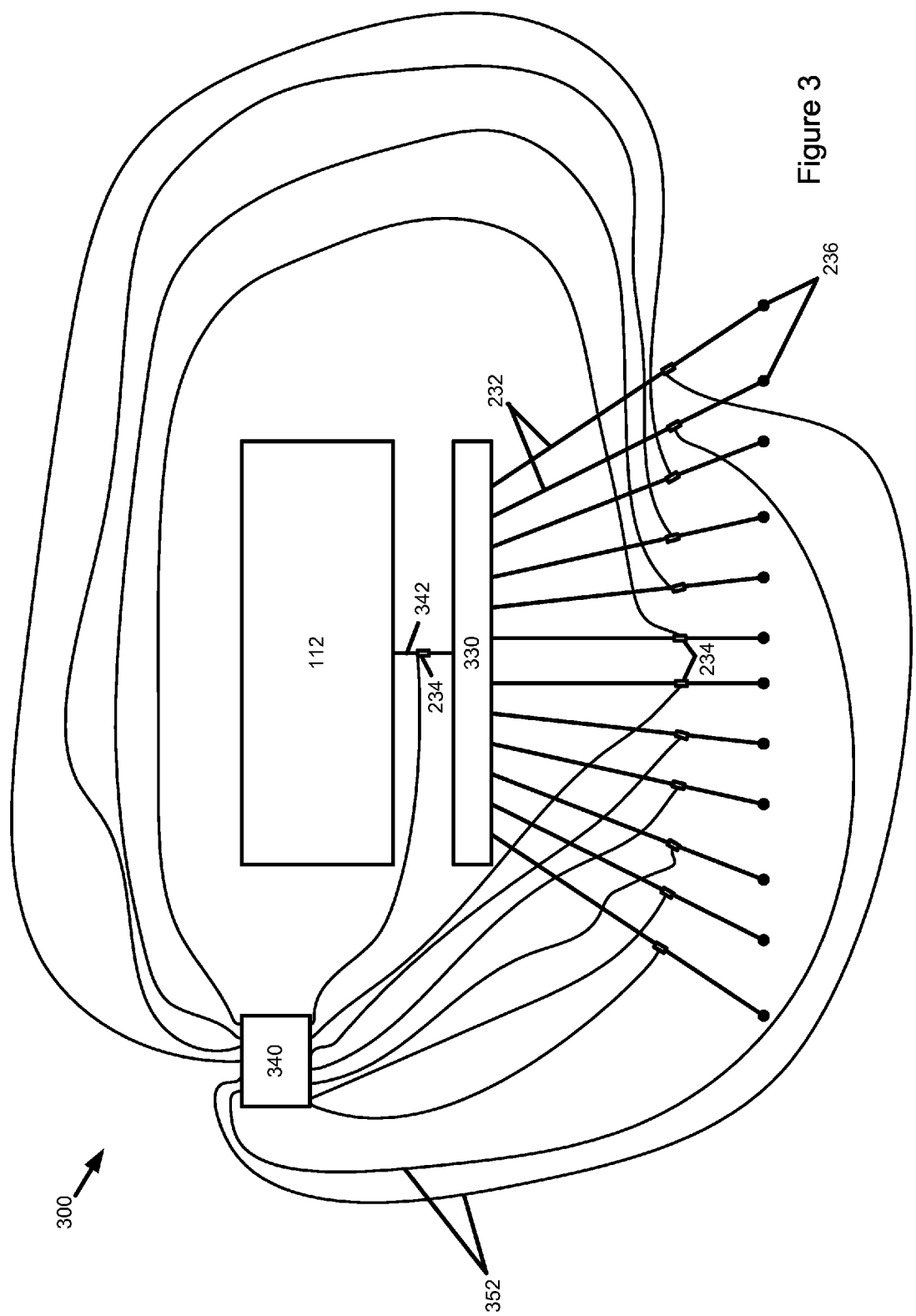
FIG. 3 shows a schematic view of an agrichemical application system of the system of FIG. 1.

Referring now to FIG. 3, an agrichemical spray system 300 of the planter 110 is shown. The system 300 includes the agrichemical tank 112 that delivers the agrichemical through a main conduit 342 to a manifold 330. Typically, a pump (not shown) is used to deliver the agrichemical from the agrichemical tank 112.

The main manifold 330, in turn, is connected to each of the conduits 232 that is used to deliver the agrichemical to each of the row units 220. Typically, but not always, the flow to each of the conduits 232 is generally uniform.

Also connected to each of the conduits 232, 342 is one of the flow meters 234. Each of the flow meters 234 is positioned in-line with respect to the conduits 232, 342. In other words, the liquid that flows through the conduits 232, 342 also flows through the flow meters 234. In this manner, the flow meters 234 provide an estimate of a rate of the liquid flowing through each of the conduits 232, 342.

The flow meters 234 can be mounted in-line at any point along the conduits 232, 342. For example, the flow meters 234 can be positioned at the point at which the conduits 232 connect to the main manifold 330, can be positioned at an interim point along the conduits 232, or can be located adjacent to the nozzles 236.

In the example shown, each of the flow meters 234 is a Series 300 Turbine Flow Meter from JLC International, Inc. of New Britain, Pa. Such a flow meter is chemically resistant and can measure flow rates to an accuracy of greater than $\frac{1}{100}$ of a gallon per minute. Other types of flow meters can also be used.

Each of the flow meters 234 is connected to a control module 340 by a wire 352. The wire 352 is used to transmit data from the flow meters 234 to the control module 340. For example, the wires 352 can be used to transmit flow rate data from the flow meters 234 to the control module 340.

Although the example depicted in FIG. 3 is wired, in alternative embodiments, a wireless system can be used. For example, in an alternative embodiment, the flow meters 234 can be configured to communicate wirelessly (e.g., using Wi-Fi or Bluetooth) with the control module 340. Alternate configurations are possible.

In this example, the control module 340 is programmed to receive data from the flow meters 234 and to present information to a user. Examples of the types of information that can be provided are described below.

In this example, the control module 340 is a computing device, such as a desktop computer, laptop computer, tablet computer, personal data assistant, or cellular device. The control module 340 can include input/output devices, a central processing unit ("CPU") or processor, a data storage device, and a network device. Typical input/output devices include keyboards, mice, displays with or without touch-screens, microphones, speakers, disk drives, CD-ROM drives, and flash drives.

Computer readable media, such as a data storage device, provides for data retention. Computer readable media can include computer readable storage media and communication media.

Computer readable storage media are physical media that include volatile and nonvolatile, removable and non-removable media implemented in any method or technology for storage of information such as computer readable instructions, data structures, program modules or other data.

Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal.

Among the plurality of information stored on the data storage device is a client operating system ("OS") and client applications. The client OS is a program that manages the hardware and software resources of the computing device.

The control module 340 can be part of a network, such as a local area network or the Internet. For example, the control module 340 can be programed to send data associated with flow rates to a remote central server for storage and/or further manipulation. The network enables the control module 340 to send and receive data. Other configurations for the control module 340 are possible.

Figure 4:
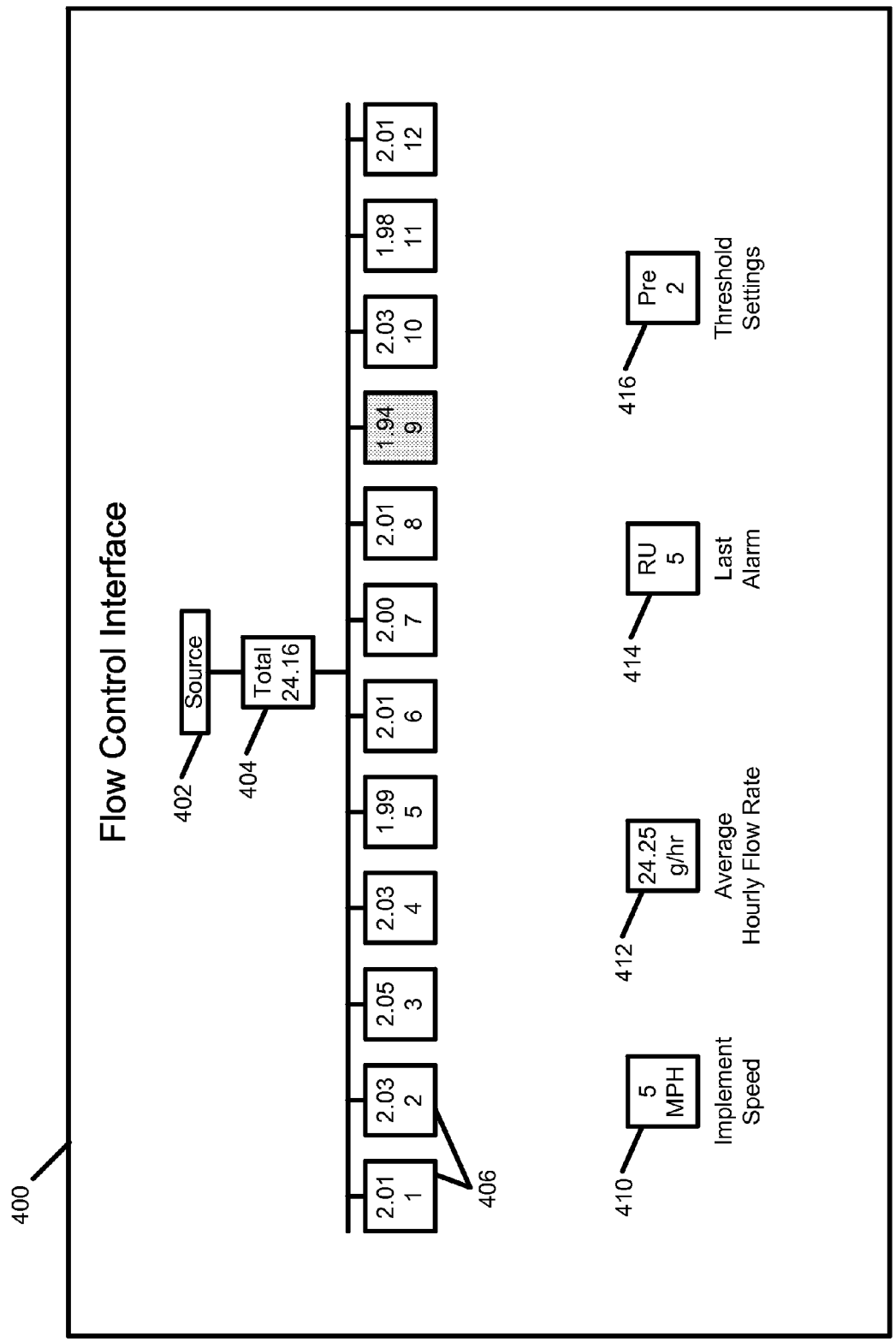
FIG. 4 shows an example graphical user interface of the agrichemical application system of FIG. 3.

Referring now to FIG. 4, in example embodiments, the control module 340 provides a graphical user interface 400 that displays information to the user based upon the data obtained from the flow meters 234.

The interface 400 generally provides a graphically representation of the farm implement so that the user can easily understand the information that is presented. For example, the interface 400 includes a source 402, corresponding to the agrichemical tank 112, and a plurality of flow indicators 404, 406 visually laid out in the same manner as the row units 220 on the farm implement.

The flow indicator 404 provides a total flow rate coming from the agrichemical tank 112, as reported by the flow meter 324 positioned in-line with the conduit 342. In this example, the flow indicator 404 states a flow rate of 24.16 gallons per minute. The flow rate shown by the flow indicator 404 updates periodically (e.g., in near real-time, multiple times per second, once per second, once every five seconds) to represent the current flow rate through the conduit 342.

The flow indicators 406 provide a total flow rate through each conduit 232. Each flow indicator 406 is positioned and labeled 1-12 to represent each of the row units 220 of the planter 110. Example flow rates include 2.01 gallons per minute for row unit 1 and 2.03 gallons per minute for row unit 2. The flow indicators 406 are numbered and depicted as they are placed on the planter 110 so that the user can easily visualize where each row unit is located. The flow rates on the flow indicators 406 are updated periodically to reflect the current flow rates in the conduits 232.

The flow indicators 404, 406 can provide other information, such as when one or more of the conduits 232 indicates a flow rate out of a given threshold. For example, a user may wish to apply a certain amount of agrichemical based on the type of plant and speed of the tractor 102. The speed of the tractor 102 is provided at speed indicator 410 (e.g., 5 miles per hour).

Based on these parameters, the user can decide certain threshold rates for applying the agrichemicals. For example, in one embodiment, the user can set a lower threshold of 1.95 gallons per minute, and an upper threshold of 2.05 gallons per minute. If the flow rate for any of the conduits 232, as reported by the flow meters 234, falls outside of these thresholds, the control module 340 can provide an alarm for the user.

For example, as shown in the interface 400, the flow rate for row unit 9 falls outside the threshold (i.e., the flow rate of 1.94 is below the lower threshold of 1.95 gallons per minute). When the flow rate is outside a threshold, an alarm can be provided for the user. The alarm can be a visual alarm, such as changing a color of the flow indicator 406 for the row unit 9, as depicted. An example is to provide a red color for any row units falling outside the thresholds or otherwise visually distinguishing the alarming indicators. Other types of alarms, such as an audible alarm, can also be provided by the control module 340.

When an alarm goes off, the user can obtain information about the alarm from the interface 400. For example, the location of the particular conduit can be located based on a brief visual inspection of the interface 400. The user can then check for abnormalities in the conduit associated with row unit 9 on the planter, such as a clogged nozzle or line breakage. In this manner, the user can quickly and easily identify problems in the application of the agrichemicals and address such problems.

The example interface 400 is a touchscreen, so the user can use a finger to select the row unit 9 depicted on the screen. When selected, information about the alarm can be provided, such as: "The flow rate of 1.94 g/min for row unit 9 is below the threshold flow rate of 1.95 g/min." Other configurations are possible. For example, a mouse or other pointing device can also be used to select objects on the interface 400.

The interface 400 also includes an average hourly flow rate indicator 412, which provide an average of the total flow rate over the past hour (e.g., 24.25 gallons per minute). The user can select the indicator 412 to obtain additional information, such as a graph showing how the average rate has changed over time, as well as preferences to change what is displayed, such as changing the display to the average daily flow rate.

A last alarm indicator 414 allows the user to obtain information about past alarms. In this example, the last alarm related to row unit 5. By selecting the indicator 414, the user can access historical information related to alarming, such as historical data on which row units have alarmed in the past.

A threshold settings indicator 416 provides information about the current thresholds that are being used for alarming. For example, as shown, the indicator 416 states that preset 2 is being used, which sets thresholds at 1.95 and 2.05 g/min. By selecting the indicator 416, the user can select other presets and/or set other desired thresholds parameters. Examples of such parameters include: (1) defining other thresholds; and (2) selecting a duration of time a flow meter must be outside of a threshold before an alarm is issued, such as requiring a flow meter to be below a threshold for at least 30 second before issuing an alarm. Other configurations are possible.

In example embodiments, the control module 340, including the interface 400, is a computing device located within the cabin of the tractor 102. In this manner, the information provided by the control module 340 is readily available to the operator of the tractor 102.

In some configurations, computing devices are provided in the cabins of tractors. For example, systems such as the SureFire Commander from SureFire Ag Systems, Inc. of Atwood, Kans., or the FmX Integrated Display from Trimble Navigation Limited of Sunnyvale, Calif., can be used. Such systems can be modified to provide the functionality of the control module 340 and the interface 400. In alternative embodiments, a separate computing device can be used for the control module.

Figure 5:
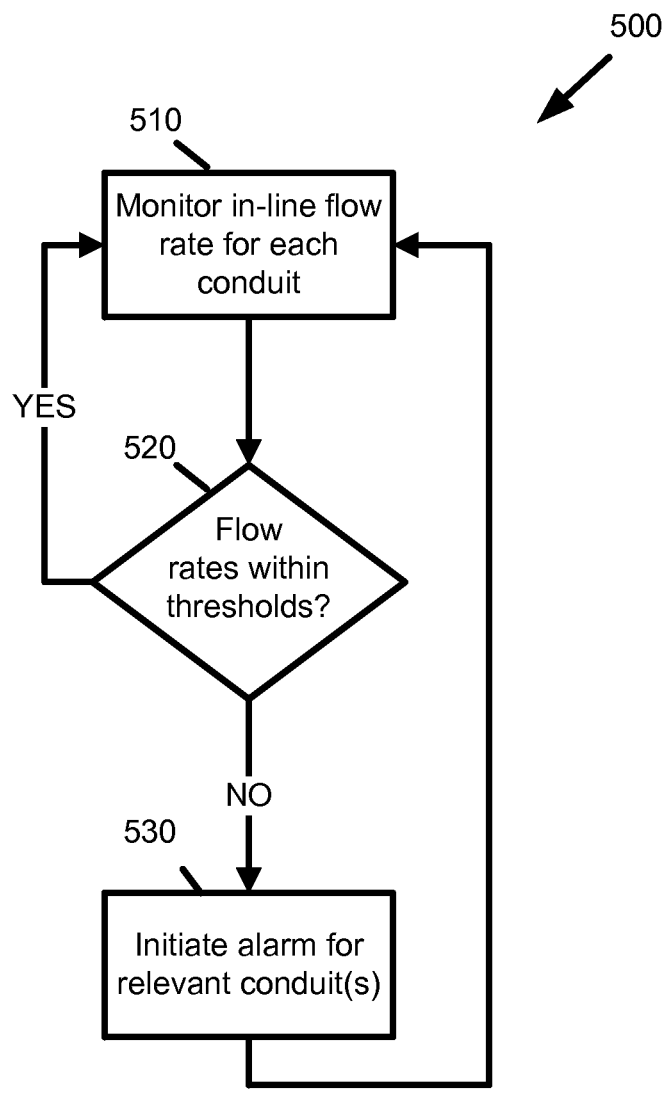
FIG. 5 shows an example method of using the agrichemical application system of FIG. 3.

Referring now to FIG. 5, an example method 500 for implementing a spray monitor system is shown.

Initially, at operation 510, the in-line flow rates for each conduit are monitored.

Next, at operation 520, a determination is made regarding whether or not all of the flow rates are within given thresholds. If so, control is passed back to operation 510. If not, control is instead passed to operation 530, and an alarm is initiated to indicate one or more of the conduits have flow rates falling outside of a threshold.

Referring now to FIG. 6, an alternative agrichemical spray system 600 is shown. In this example, the system 600 is similar to that of the system 300 described above, and the system 600 can be used in conjunction with the planter 110 or a similar agricultural implement.

However, the system 600 differs in that flow meters 634 are provided instead of the flow meters 234. The flow meters 634 are similar to that of the flow meters 234, in that the flow meters 634 can estimate a rate of the flow of liquid through the flow meters 634 and report the estimate to the control module 340. However, the flow meters 634 are different in that they are also configured to regulate the flow of liquid to each of the nozzles 236.

For example, the flow meters 634 can act as flow regulators and implement variable rate technology ("VRT"). VRT is used to regulate the flow of liquid through each conduit 232, thereby enabling the user to vary an amount of agrichemical applied to each row of crops. For example, the control module 340 can control the flow meters 634 and, in conjunction with GPS information, control the rate of agrichemicals delivered based upon position and/or time.

In other examples, the user can manually control the rate of delivery of the agrichemicals from the interface 400. For example, the interface 400 displays a flow rate for each of the conduits 232. The interface 400 can allow the user to increase or decrease the flow of agrichemicals through one or more of the conduits 232 by increasing or decreasing the flow on the interface 400. When this is done, the control module 340 communicates with the appropriate flow meters 634 to increase or decrease the flow of agrichemicals therethrough.

In the example shown, the flow of agrichemicals can be controlled through the main conduit 342 and each of the conduits 232 using the flow meters 634. The flow meters 634 can be configured to turn on and turn off individual conduits 232, 342, as well as to regulate an amount of flow through the conduits.

Although the flow meters 634 shown in this example provide both flow rate information and regulate the flow through the conduits 232, 342, in alternative designs, the VRT can be implemented separately from the flow meters.

There can be various advantages associated with the systems and methods described herein. These advantages can include one or more of the following. The systems described herein measure the in-line flow rates for each conduit, allowing the user to easily determine which, if any, conduits are applying agrichemicals at a non-preferred rate so that modifications can be made, if needed. This information is delivered in a concise and easy to digest format so that the information is readily available to the user. The flow rates are measured regardless of the type and/or color of the agrichemical and reported accurately to the user.

Further, accurate flow rates can be provided so that smaller variations in flow can be monitored, if desired. The flow meters are flexible and can be mounted at various positions along the conduits and do not require a certain orientation to function accurately.

The VRT can be used to lower input costs, help increase ROI on each acre, and/or to assist in fixing troubled areas in a field that might need additional or different fertility needs. The VRT can be used to monitor and provide the data needed to control delivery of agrichemicals to individual rows based on input data from pre-programmed prescriptions, thus giving enhanced monitoring and control of agriculture application products.

The various embodiments described above are provided by way of illustration only and should not be construed to limiting. Various modifications and changes that may be made to the embodiments described above without departing from the true spirit and scope of the disclosure.

What is claimed is:

1. A system for estimating a flow rate of an agrichemical, the system comprising:
   a plurality of conduits configured to deliver an agrichemical to a field, each of the plurality of conduits in fluid communication with a manifold through which the agrichemical is supplied; and
   a plurality of flow meters, with each of the flow meters being connected in-line with a respective one of the conduits, each of the flow meters providing an estimate of a flow rate of the agrichemical through its respective conduit, wherein each of the flow meters are positioned in-line with their respective conduits irrespective of the location of the manifold and apart from the manifold.

2. The system of claim 1, further comprising a display communicatively coupled to a processor, the display configured to display the flow rate of the agrichemical through each of the plurality of conduits.

3. The system of claim 2, wherein the display includes a graphical user interface, the graphical user interface including an indication of the flow rate of the agrichemical through each of the plurality of conduits.

4. The system of claim 1, wherein the in-line position of each of the flowmeters comprises a position proximate the manifold, a position proximate a nozzle at a delivery end of the conduit, or a position intermediate a length of the conduit.

5. The system of claim 2, wherein the display displays a flow rate through the manifold.

6. The system of claim 2, wherein the display provides an alarm indication when the flow rate through a conduit exceeds a threshold.

7. A system for estimating a flow rate of an agrichemical, the system comprising:
   a plurality of conduits configured to deliver an agrichemical to a field, each of the plurality of conduits in fluid communication with a manifold through which the agrichemical is supplied; and
   a plurality of flow meters, with each of the flow meters being connected in-line with a respective one of the conduits, each of the flow meters providing an estimate of a flow rate of the agrichemical through its respective conduit, wherein each of the flow meters are positioned in-line with their respective conduits irrespective of the location of the manifold and apart from the manifold and each of the flow meters regulating an amount of the agrichemical flowing through its respective conduit.

8. The system of claim 7, wherein each of the flow meters implements variable rate technology.

9. The system of claim 7, further comprising a display communicatively coupled to a processor, the display configured to display the flow rate of the agrichemical through each of the plurality of conduits.

10. The system of claim 9, wherein the display includes a graphical user interface, the graphical user interface including an indication of the flow rate of the agrichemical through each of the plurality of conduits.

11. The system of claim 7, wherein the in-line position of each of the flowmeters comprises a position proximate the manifold, a position proximate a nozzle at a delivery end of the conduit, or a position intermediate a length of the conduit.

12. The system of claim 9, wherein the display displays a flow rate through the manifold.

13. The system of claim 9, wherein the display provides an alarm indication when the flow rate through a conduit exceeds a threshold.

14. A system for delivering agrichemicals to a field of crops, the system comprising:
   a tractor;
   a farm implement pulled by the tractor, the farm implement including a tank of agrichemical and a plurality of conduits to deliver an agrichemical from the tank, via a manifold, to a plurality of rows in a field; and
   a plurality of flow meters, with each of the flow meters being connected in-line with a respective one of the conduits, the flow meters providing an estimate of a flow rate of the agrichemical through each of the conduits, wherein each of the flow meters are positioned in-line with their respective conduits irrespective of the location of the manifold and apart from the manifold.

15. The system of claim 14, further comprising a display communicatively coupled to a processor, the display configured to display the flow rate of the agrichemical through each of the plurality of conduits.

16. The system of claim 15, wherein the display includes a graphical user interface, the graphical user interface including an indication of the flow rate of the agrichemical through each of the plurality of conduits.

17. The system of claim 14, wherein the in-line position of each of the flowmeters comprises a position proximate the manifold, a position proximate a nozzle at a delivery end of the conduit, or a position intermediate a length of the conduit.

18. The system of claim 15, wherein the display displays a flow rate through the manifold.

19. The system of claim 15, wherein the display provides an alarm indication when the flow rate through a conduit exceeds a threshold.

* * * * *